United States Patent
Dausch et al.

(10) Patent No.: US 7,184,844 B2
(45) Date of Patent: Feb. 27, 2007

(54) CENTRAL SITE ARCHITECTURE FOR REMOTE SERVICE DELIVERY

(75) Inventors: Mark E. Dausch, Castleton, NY (US); Mark D. Osborn, Albany, NY (US)

(73) Assignee: General Electric Company, Niskayuna, NY (US)

(*) Notice: Subject to any disclaimer, the term of this patent is extended or adjusted under 35 U.S.C. 154(b) by 827 days.

(21) Appl. No.: 10/248,157

(22) Filed: Dec. 20, 2002

(65) Prior Publication Data

US 2004/0122921 A1 Jun. 24, 2004

(51) Int. Cl.
- G05B 15/02 (2006.01)
- G05B 19/18 (2006.01)
- G05B 11/01 (2006.01)

(52) U.S. Cl. .............. 700/9; 700/19; 700/20; 700/65; 700/66; 709/217; 709/218; 709/219; 709/200; 340/3.1; 340/3.2; 340/3.9; 707/1; 707/7; 707/10

(58) Field of Classification Search .......... 700/9, 700/19, 20, 65, 66; 709/217, 218, 219, 200; 340/3.1–3.9; 707/1, 7, 10

See application file for complete search history.

(56) References Cited

U.S. PATENT DOCUMENTS

| | | | |
|---|---|---|---|
| 5,844,808 A | * | 12/1998 | Konsmo et al. ............ 700/244 |
| 6,509,841 B1 | | 1/2003 | Colton et al. |
| 6,546,553 B1 | | 4/2003 | Hunt |
| 6,564,104 B2 | * | 5/2003 | Nelson et al. .............. 607/60 |
| 6,565,510 B1 | | 5/2003 | Haider |
| 6,580,916 B1 | | 6/2003 | Weisshaar et al. |
| 6,795,798 B2 | * | 9/2004 | Eryurek et al. ............ 702/188 |
| 6,934,862 B2 | * | 8/2005 | Sharood et al. ............ 713/300 |
| 2002/0016829 A1 | * | 2/2002 | Defosse ..................... 709/217 |
| 2002/0120518 A1 | * | 8/2002 | Carney et al. ............... 705/14 |

FOREIGN PATENT DOCUMENTS

EP 001432273 A2 * 6/2004

* cited by examiner

Primary Examiner—Ramesh Patel
(74) Attorney, Agent, or Firm—Fletcher Yoder

(57) ABSTRACT

There is provided a central site system for communicating with at least one remote site equipment monitor, the at least one remote site equipment monitor collecting operational data concerning remote site equipment. The central site system includes a data transfer system adapted for receiving the operational data from the at least one remote site equipment monitor. The central site system also includes an operational data access system which receives the operational data from the data transfer system and stores the operational data in a data storage unit of the operational data access system. The central site system also includes a notification distribution system which receives data based on the operational data and distributes the data based on the operational data to a destination according to a predefined schedule.

25 Claims, 8 Drawing Sheets

Fig. 8

| Work Center - Possible Scenario | |
|---|---|
| User Actions | Backround Process |
| 1) User logs onto Work Center | 1) Session Manager starts and is automatically updated with a list of equipment assigned to that user |
| 2) User clicks on health review | 2) Display is updated with the status of the assigned equipment |
| 3) User enters an equipment identifier | 3.1) Session manager begins recording this session |
| | 3.2) Display is updated with plots generated with data from the last transfer |
| 4) User acknowledges the health review | 4) Session manager records the acknowledgement by saving the date/time and identifiers |
| 5) User selects another unit | 5) Session manager closes the session and begins a new session |
| 6) User clicks on diagnostic results | 6) Display is updated with diagnostic results |
| 7) User reviews the results and documents findings in the electronic notebook | 7.1) Session manager records the acknowledgement by saving the date/time and the identifiers |
| | 7.2) Electronic notebook stores the user's comments, date/time, and identifiers |
| 8) User clicks on call tracking to create case | 8) Interface to call tracking system is initialized Date/time and identifiers are filled in from session manager |

CENTRAL SITE ARCHITECTURE FOR REMOTE SERVICE DELIVERY

BACKGROUND OF THE INVENTION

This invention is related generally to a system architecture for remotely monitoring equipment and providing diagnostic, prognostic, and other information for the equipment.

The performance of heavy industrial equipment, such as gas turbines, jet engines, industrial motors, locomotives, etc., will tend to decline over time, and ultimately failure occurs. When the equipment's performance declines to an unacceptable level, and the equipment customer is aware of the unacceptable level, the customer may call an equipment service provider to perform necessary maintenance or repairs as per a service contract between the equipment customer and the equipment service provider. The service provider may also periodically provide maintenance on the equipment as per the contract without receiving a call from the equipment customer.

SUMMARY OF THE INVENTION

In accordance with one aspect of the present invention, there is provided central site system for communicating with at least one remote site equipment monitor, the at least one remote site equipment monitor collecting operational data concerning remote site equipment. The central site system comprises: a data transfer system adapted for receiving the operational data from the at least one remote site equipment monitor; an operational data access system which receives the operational data from the data transfer system and stores the operational data in a data storage unit of the operational data access system; and a notification distribution system which receives data based on the operational data and distributes the data based on the operational data to a destination according to a predefined schedule.

In accordance with another aspect of the present invention, there is provided a central site system for communicating with at least one remote site equipment monitor, the at least one remote site equipment monitor collecting operational data concerning remote site equipment. The central site system comprises: a data transfer system adapted for receiving the operational data from the at least one remote site equipment monitor; an operational data access system which receives the operational data from the data transfer system and stores the operational data in a data storage unit of the operational data access system; and a diagnostic engine communicating with and receiving operational data from the operational data access system, and providing an indication of the operation of equipment monitored by the at least one equipment monitor based upon an analysis of the received operational data.

BRIEF DESCRIPTION OF THE DRAWINGS

FIG. 8 is a Figure illustrating a possible scenario at the Work Center.

DETAILED DESCRIPTION OF THE PREFERRED EMBODIMENTS

Reference will now be made in detail to presently preferred embodiments of the present invention. Wherever possible, the same reference numbers will be used throughout the drawings to refer to the same or like parts.

The present inventors have realized that there is a need for a system architecture that allows for the collection of equipment operational data at an equipment site, and then transferring of that operation data to a central site remote from the equipment site for performance of diagnostics concerning the equipment. An equipment service provider using the system architecture would be able to manage the operational data to achieve several benefits and provide improved equipment. For example, the service provider could make an informed decision about when and whether or not to make a service call to repair, replace, or maintain the remote equipment based upon the collection of data stored at the central site concerning the health or status of the equipment.

Furthermore, other information relative to the remote equipment which is important to the service provider and customer can be correlated at the central site, and distributed to an appropriate destination. For example, insurance data concerning the equipment would be available at the central site, and would aid in allowing a service provider to make an informed decision on what action to take based on the current monitored status of the equipment. For equipment subject to regulations, such as emissions regulations, data on the equipment emissions and regulations might be stored at the central site, and a service provider or customer could be informed of the equipment failing its emission standard, and appropriate action can then be taken.

The information infrastructure provided by the central site data storage and diagnostics integrated with the remote site operational data collection allows for flexibility. This integrated system may provide access to equipment operational data, access to the equipment's configuration information, the transformation and distribution of operational data, notification of events such as equipment failure, generation of reports and messages, and the integration of Web based and client based tools for visualization, diagnostics and other applications.

Figure 1:
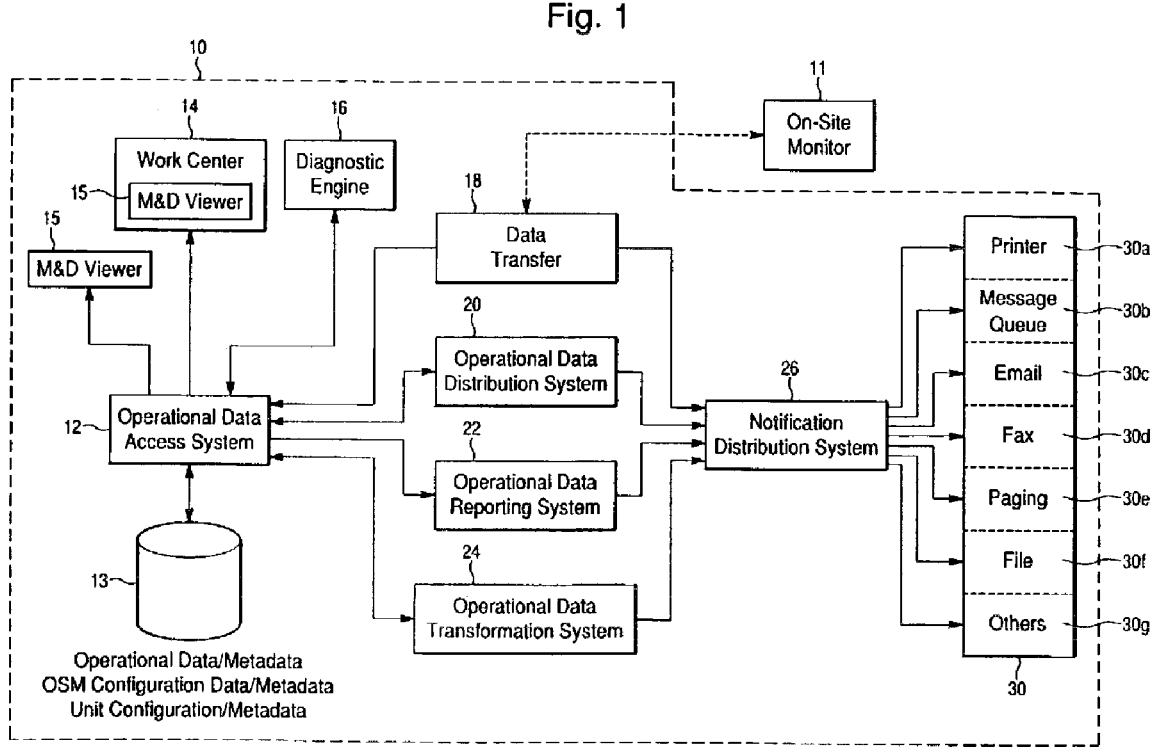
FIG. 1 is a schematic of a central site system according to a preferred embodiment of the invention.

FIG. 1 is a schematic of the central site system 10 according to a preferred embodiment of the invention, where the central site system 10 is in communication with a remote site equipment monitor 11. The central site system 10 is shown within the dashed lines. The remote site equipment monitor 11 is not part of the central site system 10 in this embodiment, and is remote from the central site system 10. The remote site equipment monitor 11 monitors one or more pieces of equipment (not shown), such as gas turbines, jet engines, etc., at an equipment site, and collects operational data concerning the equipment. The remote site equipment monitor 11 interfaces either directly with the equipment being monitored or to the equipment's controller (not shown). The remote site equipment monitor 11 may automatically collect and store operational data. The operational data is data concerning the operation of the equipment, such as the speed and temperature of the equipment, and emissions data, if applicable. Equipment monitors are generally known in the art.

The central site system 10 includes a data transfer system 18, which is adapted for the receiving operational data from the remote site equipment monitor 11. In general, the data transfer system 18 will be connected to a number of remote site equipment monitors, and will be connected to at least one remote site equipment monitor. The data transfer system 18 also transfers the operational data received from the remote site equipment monitor 11 to an operational data access system 12.

The central site system 10 also includes a number of other subsystems as shown in FIG. 1. These subsystems include an operational data distribution system 20 which requests and receives operational data from the operational data access system 12 and customizes the data into at least one customized data set, an operational data reporting system 22 which requests and receives operational data from the operational data access system 12 and converts the operational data into at least one predefined informational report, and an operational data transformation system 24 which requests and receives operational data from the operational data access system 12 and transforms the operational data into transformed data according to a predefined transformation definition.

The central site system 10 also includes a notification distribution system 26 which receives data based on the operational data and distributes the data based on the operational data to a destination according to a predefined schedule. The notification distribution system 26 may receive the data from any of the data transfer system 18, operational data distribution system 20, operational data reporting system 22, and operational data transformation system 24. The notification distribution system 26 also includes a number of modes of communication 30 for communicating with a number of different destinations. The modes of communication may include communication modes for a printer 30a, message queue 30b, e-mail 30c, facsimile 30d, paging system 30e, data storage file 30f and other communication modes 30g. The modes of communication are connected to respective communication devices (not shown) outside of the central site system 10, such as a printer, etc.

The central site system 10 also includes a work center 14 that allows for user interaction with the central site system 10. The work center 14 may include a viewer 15 that displays data graphically and or numerically for a user. The viewer 115 may be a monitoring and diagnostics viewer (M&D viewer), for example. Alternately, the viewer 15 may be separate from the work center 14.

The subsystems of the central site system 10 are now described in more detail below.

Figure 2:
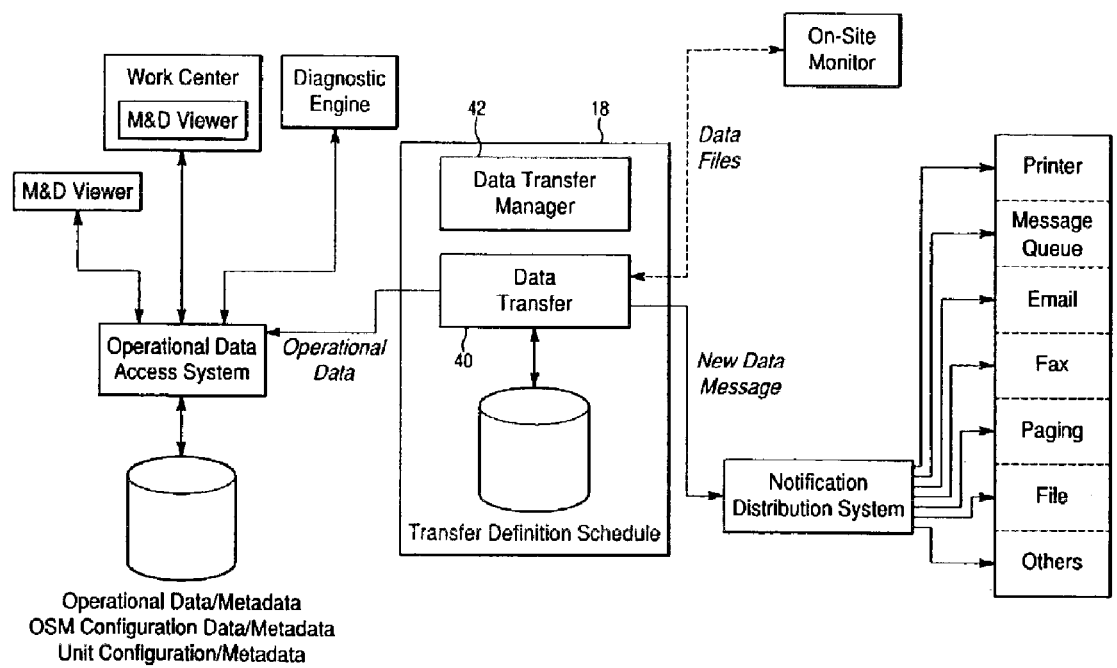
FIG. 2 is a schematic of the central site system according to a preferred embodiment of the invention illustrating the data transfer system in greater detail.

FIG. 2 illustrates the data transfer system 18, and its communication with other subsystems and the remote site equipment monitor 11. For ease of illustration, not all of the subsystems are shown in FIG. 2. The data transfer system 18 is responsible for scheduling operational data transfer from the remote site equipment monitor 11 to the central site system 10, for initiating a connection between the remote site equipment monitor 11 and the central site system 10, and for managing data and file transfers.

The data transfer system 18 includes a data transfer unit 40 and a data transfer manager 42. The data transfer unit 40 is adapted for initiating a connection with the remote site equipment monitor 11. The data transfer unit 40 also interfaces and communicates with the operational data access system 12 for requesting data insertion into the operational database, and to the notification distribution system 26 to provide new data messages, i.e., messages that new operational data has been received from the remote site equipment monitor 11.

The data transfer manager 42 provides for the transfer of the operational data from the remote site equipment monitor 111 according to a data transfer schedule. The data transfer manager 42 may include its own database system to manage the transfer schedule. The transfer schedule may include, for example, a list of operational data elements, a sample transfer rate, a time interval between data transfers, a time for a next data transfer, and other associated data. The data transfer manager 42 is responsible for scheduling the transfer.

Figure 3:
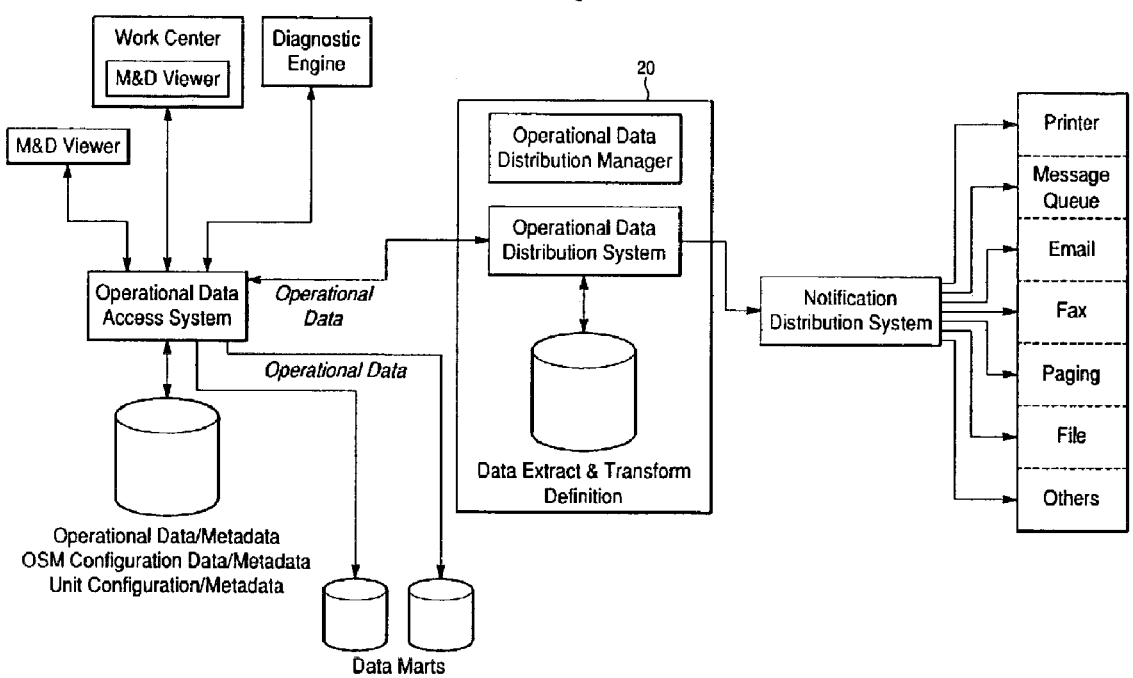
FIG. 3 is a schematic of the central site system according to a preferred embodiment of the invention illustrating the operational data distribution system in greater detail.

FIG. 3 illustrates the operational data distribution system 20, and its communication with other subsystems. For ease of illustration, not all of the subsystems are shown in FIG. 3. The operational data distribution system 20 is responsible for managing customized data sets. These data sets may be stored in data marts, for example, which can reside on a local database server or may be distributed to multiple database servers.

The operational data distribution system 20 requests and receives operational data from the operational data access system 12 and customizes the data into at least one customized data set. The operational data distribution manager 20 is responsible for scheduling the distribution of the customized data sets. This system interfaces to the operational data access system 12 for requesting operational data and for inserting data into the appropriate data marts. The operational data distribution system 20 transfers the at least one customized data set to the notification distribution system 26 according to an operational data distribution schedule. The notification distribution system 26 then transfers the at least one customized data set to an appropriate destination according to the operational data distribution schedule.

The operational data distribution system 20 may employ its own database system to manage the extraction and distribution of customized data sets. For example, a customized data set could be for an equipment site with an equipment monitor 1 including sensors for monitoring vibration of gas turbine equipment. This data set could then be distributed to the appropriate destination of a workstation or engineer via the notification distribution system 26.

Figure 4:
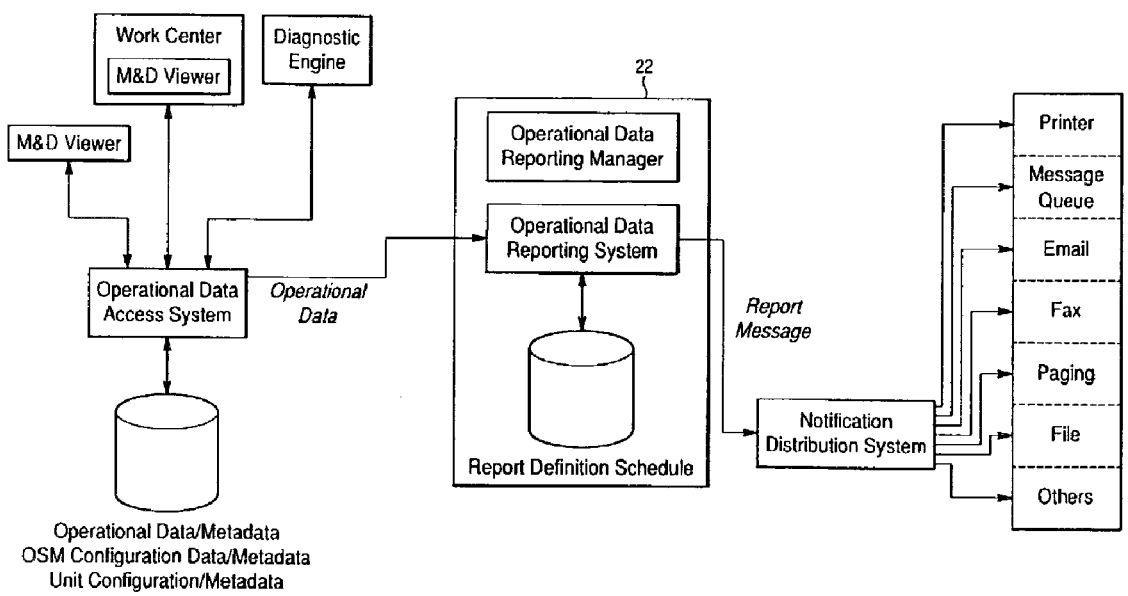
FIG. 4 is a schematic of the central site system according to a preferred embodiment of the invention illustrating the operational data reporting system in greater detail.

FIG. 4 illustrates an operational data reporting system 22, and its communication with other subsystems. For ease of illustration, not all of the subsystems are shown in FIG. 4. The operational data reporting system 22 converts operational data into predefined informational reports according to a specified schedule. These reports can include textual as well as graphical information. The operational data reporting system 22 manages the report definitions and schedules in a database system. The operational data reporting manager 22 determines which report to process and when. The operational data reporting manager 22 interfaces to the operational data access system 12 for data requests and notifies the notification distribution system 26 with a report message.

The operational data reporting system 22 requests and receives operational data from the operational data access system 12 and converts the operational data into at least one predefined informational report. The operational data reporting system 22 transfers the at least one predefined informational report to the notification distribution system 26 according to an informational report distribution schedule. The notification distribution system 26 transfers the at least one predefined informational report to an appropriate destination according to the predefined informational report distribution schedule.

Figure 5:
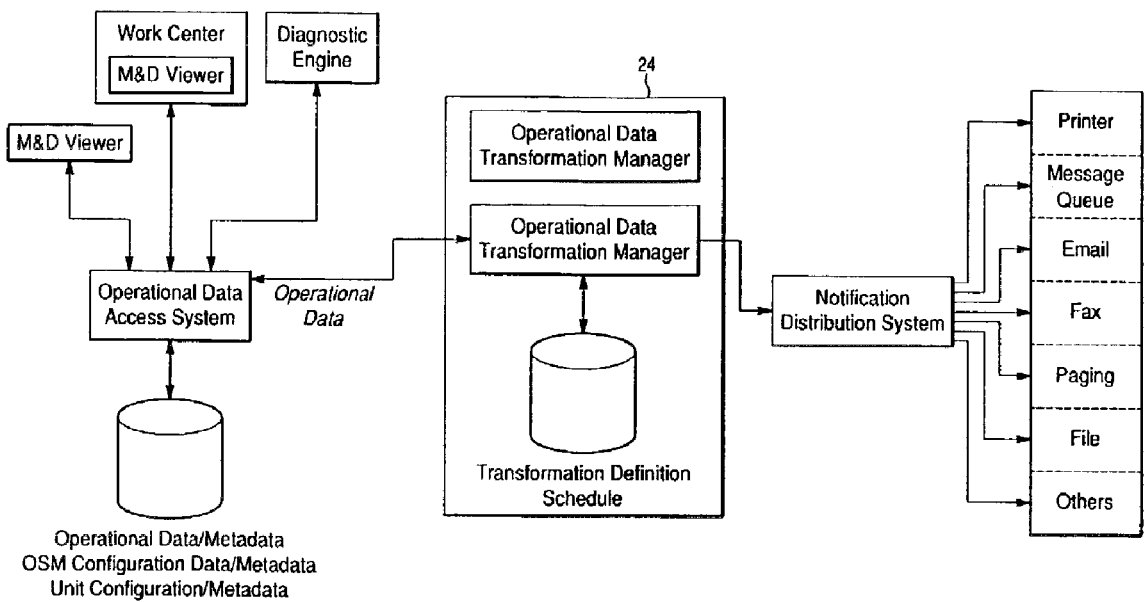
FIG. 5 is a schematic of the central site system according to a preferred embodiment of the invention illustrating the operational data transformation system in greater detail.

FIG. 5 illustrates an operational data transformation system 24, and its communication with other subsystems. For ease of illustration, not all of the subsystems are shown in FIG. 5. The operational data transformation system 24 transforms the operational data into a more useful form. Transforming the data refers to applying some type of algorithm to the data. For example, high pass filtering, low pass filtering and weighted averaging may be applied to the data. The operational data transformation system 24 can also perform calculations on the data and generate result sets. This system has a manager for scheduling transformations and has a local database for storing transformation definitions and schedules. The operational data transformation system 24 communicates with the operational data access system 12 for retrieving and storing data. Upon completion of any transformation, a message may sent to the notification distribution system 26 for distribution.

The operational data transformation system 24 requests and receives operational data from the operational data access system 12 and transforms the operational data into transformed data according to a predefined transformation definition. The operational data transformation system 24 transfers the transformed data to the notification distribution system 26 according to a transformed data distribution schedule. The notification distribution system 26 transfers the transformed data to an appropriate destination according to the transformed data distribution schedule.

Figure 6:
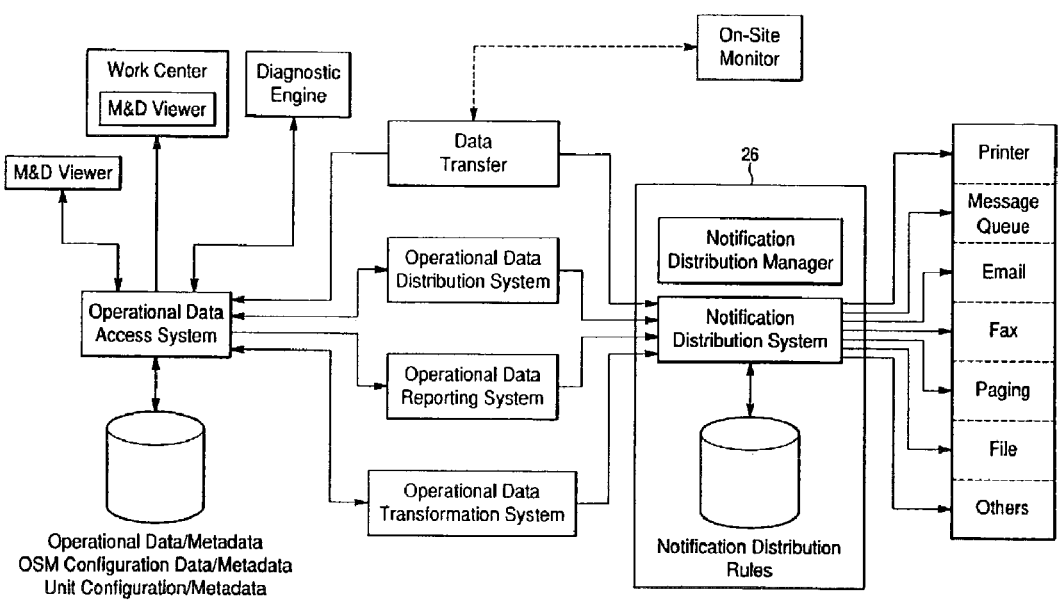
FIG. 6 is a schematic of the central site system according to a preferred embodiment of the invention illustrating the notification distribution system in greater detail.

FIG. 6 illustrates the notification distribution system 26, and its communication with other subsystems. The notification distribution system 26 provides a general service available to any other service for distributing information. The notification distribution system 26 supports multiple modes of communication 30 including modes for printers 30a, message queues 30b, e-mails 30c, faxes 30d, paging 30e, files 30f, and others 30g. The notification distribution system 26 system has a manager for managing the scheduling and the distribution of information and also a data storage for containing distribution rules. The manager of the notification distribution system 26 may also provide a user interface for creating, modifying, and deleting the rules. The communication can be asynchronous or synchronous.

Figure 7:
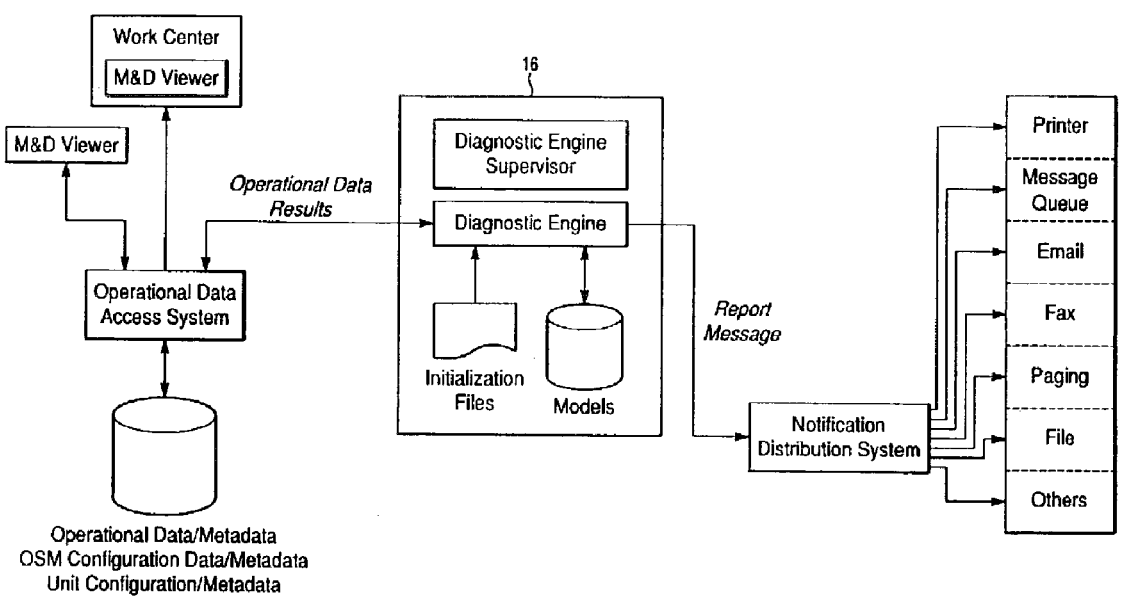
FIG. 7 is a schematic of the central site system according to a preferred embodiment of the invention illustrating the diagnostic engine in greater detail.

FIG. 7 illustrates the diagnostic engine 16, and its communication with other subsystems. For ease of illustration, not all of the subsystems are shown in FIG. 7. The diagnostic engine 16 communicates with and receives operational data from the operational data access system 12, and provides an indication of the operation of equipment monitored by the at least one equipment monitor based upon an analysis of the received operational data. The indication of the operation may be, for example, equipment failure, or a reduced performance of the equipment.

The diagnostic engine 16 includes applications that process the operational data, determine or identify anomalies, and generate calculations and results. The diagnostic engine 16 typically contains rule-based or model-based algorithms that when applied to the operational data may predict the health of the equipment being monitored. The models or algorithms and initialization files for initializing the knowledge base may be included in a database of the diagnostic engine 16. The initializing information may be used along with the operational data in diagnosing equipment. A system user may request the appropriate operational data to be used in the analysis and may initiate the diagnostic engine, or this may be performed automatically. The diagnostic engine system 16 interfaces with the operational data access system 12 for data retrieval insertion and communicates with the notification distribution system 26 with alerts and other report type messages.

Returning to FIG. 1, the operational data access system 12, work center 14 and viewer 15 are now further described. The operational data access system 12 may provide secured and transparent access to the central site data storage unit 13 of the operational data access system 12 via the work center 14. The operational data access system 12 may also provide a common interface for client applications, and accommodate multiple data collection strategies and multiple data reduction strategies via the work center 14.

The work center 14 may include a Web browser and integration software for hosting a collection of cooperating applications that support the functions and activities of the central site 10. The work center 14 allows for user interaction with the operational data access system through any one of a plurality of user applications. The work center 14 facilitates the sharing of information between applications; thus, improving the productivity and efficiency of service delivery. Applications include, for example equipment health monitoring, electronic notebook, equipment diagnostics, equipment problem escalation, equipment prognostics, and record and journal keeping. Management applications may also be hosted by the work center 14 and may include scheduling of monitoring of equipment and personnel, work load balancing, and service contract compliance. Possible administrative applications could support time management and session management.

The viewer 15 provides for displaying data graphically and numerically, allows for defining plots and data sets, and interfaces with the operational data access system 12 for retrieving of data. The user can specify filters for reducing the amount of data in the requested result sets. Plots can be exported in various formats for including in reports.

FIG. 8 illustrates a possible scenario for a user at the work center 14. The user begins by logging onto the work center 14. The user then may choose a desired application. In this scenario, the user first chooses to run a health review application to review the health of some remotely monitored equipment. The user clicks on the health review application to start the application, and enters an appropriated equipment identifier. The user may then see information on a display concerning the health of the identified piece of equipment. The user than acknowledges the health review.

The user may choose to run another application, and thus selects another unit, and clicks on a diagnostic results application to the start the application. The user can then review the diagnostic results for the earlier identified piece of equipment on the display, and store comments and finding in an electronic notebook application, for example. The user may then choose to initiate a call tracking application to keep track of his findings. The user can continue to use a number of applications from the work center 14, as desired.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A central site system for communicating with at least one remote site equipment monitor, the at least one remote site equipment monitor collecting operational data concerning remote site equipment, the central site system comprising:
 a data transfer system adapted for receiving the operational data from the at least one remote site equipment monitor;
 an operational data access system which receives the operational data from the data transfer system and stores the operational data in a data storage unit of the operational data access system; and
 a notification distribution system which receives data based on the operational data and distributes the data based on the operational data to a destination according to a predefined schedule.

2. The central site system of claim 1, wherein the data transfer system further comprises:
 a data transfer unit adapted for initiating a connection with one of the at least one remote site equipment monitors.

3. The central site system of claim 2, wherein the data transfer system further comprises:
 a data transfer manager which provides for the transfer of the operational data from the at least one remote site equipment monitor according to a data transfer schedule.

4. The central site system of claim 3, wherein the data transfer schedule includes at least one of a list of operational data elements, a sample transfer rate, a time interval between data transfers, and a time for a next data transfer.

5. The central site system of claim 3, wherein the data transfer system communicates with the notification distribution system, and provides a notification to the notification distribution system that new operational data has been received from the at least one remote site equipment monitor.

6. The central site system of claim 1, further comprising:
 an operational data distribution system which requests and receives operational data from the operational data access system and customizes the data into at least one customized data set.

7. The central site system of claim 6, wherein the operational data distribution system transfers the at least one customized data set to the notification distribution system according to an operational data distribution schedule, and wherein the notification distribution system transfers the at least one customized data set to an appropriate destination according to the operational data distribution schedule.

8. The central site system of claim 1, further comprising:
 an operational data reporting system which requests and receives operational data from the operational data access system and converts the operational data into at least one predefined informational report.

9. The central site system of claim 8, wherein the operational data reporting system transfers the at least one predefined informational report to the notification distribution system according to an informational report distribution schedule, and wherein the notification distribution system transfers the at least one predefined informational report to an appropriate destination according to the predefined informational report distribution schedule.

10. The central site system of claim 1, further comprising:
 an operational data transformation system which requests and receives operational data from the operational data access system and transforms the operational data into transformed data according to a predefined transformation definition.

11. The central site system of claim 10, wherein the operational data transformation system transfers the transformed data to the notification distribution system according to a transformed data distribution schedule, and wherein the notification distribution system transfers the transformed data to an appropriate destination according to the transformed data distribution schedule.

12. The central site system of claim 1, wherein the notification distribution system comprises at least one mode of communication for distributing the data based on the operational data to the predefined destination.

13. The central site system of claim 12, wherein the at least one mode of communication includes at least one of a message queue, e-mail, facsimile, paging, data storage file, and a printer communication mode.

14. The central site system of claim 1, wherein the notification distribution system comprises a user interface which allows a user to modify the predefined schedule.

15. The central site system of claim 1, wherein the predefined schedule includes at least one of a message destination, notification requester, data creation date, and message priority.

16. The central site system of claim 1, further comprising:
 a diagnostic engine communicating with and receiving operational data from the operational data access system, and providing an indication of the operation of equipment monitored by the at least one equipment monitor based upon an analysis of the received operational data.

17. The central site system of claim 16, wherein the diagnostic engine provides the indication of the operation of the equipment based an algorithm stored in the diagnostic engine.

18. The central site system of claim 16, wherein the diagnostic engine provides the indication of the operation of the equipment based on information from initialization files stored in the diagnostic engine, wherein the initialization files provide information regarding the initial condition of the equipment.

19. The central site system of claim 16, wherein the diagnostic engine communicates with the notification distribution system and provides the indication of the operation of the equipment to the notification distribution system.

20. The central site system of claim 1, wherein the data storage unit of the operational data access system stores in addition to operational data, other data concerning equipment monitored by the least one remote site monitor.

21. The central site system of claim 1, further comprising:
 a work center communicating with the operational data access system, the work center allowing user interaction with the operational data access system through any one of a plurality of user applications.

22. The central site system of claim 21, wherein the plurality of user applications include at least one of equipment status monitoring, electronic notebook, diagnostics, problem escalation, prognostics, and record and journal keeping.

23. The central site system of claim 21, wherein the plurality of user applications include at least one management application of equipment scheduling, personnel scheduling, work load balancing, and contract compliance.

24. The central site system of claim 21, further comprising:
a work center viewer that displays textual or graphic data concerning the operational data.

25. A central site system for communicating with at least one remote site equipment monitor, the at least one remote site equipment monitor collecting operational data concerning remote site equipment, the central site system comprising:
a data transfer system adapted for receiving the operational data from the at least one remote site equipment monitor;
an operational data access system which receives the operational data from the data transfer system and stores the operational data in a data storage unit of the operational data access system;
a diagnostic engine communicating with and receiving operational data from the operational data access system, and providing an indication of the operation of equipment monitored by the at least one equipment monitor based upon an analysis of the received operational data, and
a notification distribution system which receives data based on the operational data and distributes the data based on the operational data to a destination according to a predefined schedule.

* * * * *